United States Patent [19]
Boland et al.

[11] Patent Number: 5,682,319
[45] Date of Patent: Oct. 28, 1997

[54] COMPUTER NUMERICALLY CONTROLLED MACHINES

[75] Inventors: Patrick Gerard Boland, Kew; Glenn Charles Brien, Harkaway, both of Australia

[73] Assignee: ANCA Pty. Ltd., Bayswater North, Australia

[21] Appl. No.: 563,410

[22] Filed: Nov. 28, 1995

Related U.S. Application Data

[63] Continuation of Ser. No. 157,033, filed as PCT/AU92/00259, Jun. 4, 1992, published as WO92/22023, Dec. 10, 1992, abandoned.

[30] Foreign Application Priority Data

Jun. 4, 1991 [AU] Australia ............... PK6494

[51] Int. Cl.⁶ .................................................. G06F 19/00
[52] U.S. Cl. ....................... 364/474.31; 364/474.28; 364/474.3; 318/573
[58] Field of Search ...................... 364/181, 191, 364/474.3, 474.28, 474.31; 318/570, 571, 573

[56] References Cited

U.S. PATENT DOCUMENTS

| | | |
|---|---|---|
| 3,657,525 | 4/1972 | Evans .................. 235/151.11 |
| 3,783,253 | 1/1974 | Anderson et al. .......... 318/568 |
| 3,792,333 | 2/1974 | Cutler ................... 318/571 |
| 4,433,382 | 2/1984 | Cunningham et al. ...... 364/474.34 |
| 4,503,373 | 3/1985 | Nozawa et al. ............ 364/181 |
| 4,510,427 | 4/1985 | Nozawa et al. ............ 318/540 |
| 4,591,771 | 5/1986 | Nozawa et al. ............ 318/569 |
| 4,591,968 | 5/1986 | Nozawa et al. .......... 364/167.01 |
| 5,144,550 | 9/1992 | Sasaki et al. ............. 364/192 |
| 5,315,503 | 5/1994 | Kato et al. ............... 364/191 |
| 5,493,193 | 2/1996 | Seki et al. ............... 318/573 |

Primary Examiner—Paul P. Gordon
Attorney, Agent, or Firm—Keck, Mahin & Cate

[57] ABSTRACT

A computer numerically controlled (CNC) machine tool is provided in which a cutting tool is movable along a programmed path determined by a part program in a programmable control unit (PCU). A trajectory interpolator receives high level motion commands and a feedrate specification from the PCU to produce interpolated position commands. A position controller controls movement of the cutting tool in response to the interpolated position commands. The machine tool further includes a handwheel and a manual pulse generator (MPG) which can be used in MPG feed mode to control movement of the cutting tool incrementally along the programmed path in either the forward or reverse direction. In MPG feed mode, an MPG feed specification from an MPG position counter is superimposed onto the feedrate specification in the trajectory interpolator. MPG feed mode can be used advantageously during part program tryout, or during a cutting operation to retrace along the programmed path, to extract the cutting tool from the workpiece if the tool jams or breaks.

19 Claims, 5 Drawing Sheets

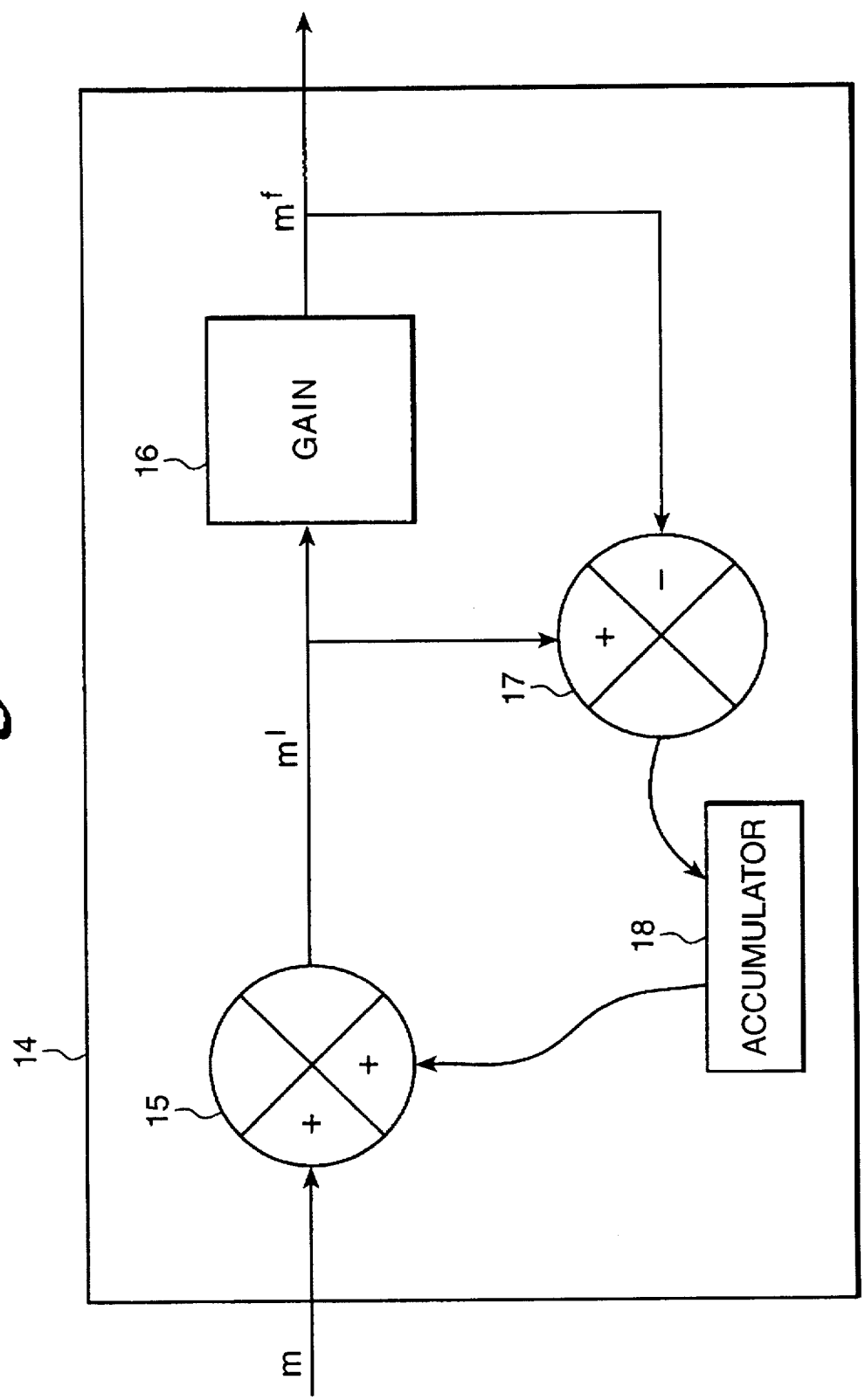

COMPUTER NUMERICALLY CONTROLLED MACHINES

This is a continuation of Ser. No. 08/157,033, filed as PCT/AU92/00259 Jun. 4, 1992 published as WO92/22023 Dec. 10, 1992, now abandoned.

This invention relates to computer numerical controlled (CNC) machines having a movable operative part. It is particularly concerned with CNC machine tools in which the movable operative part comprises a cutting tool. As used in this specification the term cutting tool refers to the portion of a machine tool that is designed to act upon a workpiece to perform the desired task. In the context of this invention, the term cutting tool is not restricted to standard turning or milling cutters, but also includes all mechanical, electronic and/or electro-mechanical devices used to modify the shape and/or properties of a workpiece. Examples of cutting tools include: end-mills, turning tools, grinding wheels, laser cutting beams, plasma beams and punch tools. It will, however, be appreciated that the invention is equally applicable to any computer numerically controlled machine having at least one movable operative part, and so the invention has application in other fields such as robotics.

The development of multi axis and multifunction machine tools in conjunction with the development of sophisticated computer controlled operations has facilitated the emergence of a generation of very high speed precision machine tools capable of complex multi-step operations from one machine.

Typically a CNC machine is controlled by a computer program, called a part program, which serially instructs the machine to perform a sequential series of discrete operations in a predetermined sequence so that the movable operative part moves along a programmed path determined by the part program. Each individual instruction is termed a "block" and may constitute a determining command for each or a combination of controllable axes. For example, a block may instruct a cutting tool to move 5 mm in the Y axis at a given velocity. Multiple axis blocks may instruct a cutting tool to rotate and move forward 0.05 mm in the X and Y axis at a given velocity. The blocks, once programmed into the computer, are then fixed in a set sequential order. The whole set of sequential blocks may then be automatically operated by the CNC machine which then operates from start to finish of the part program.

CNC machines conventionally include a trajectory interpolator and a position controller. The trajectory interpolator produces interpolated position commands from inputs representing a feedrate specification, i.e. all the data required to determine the desired feedrate along the programmed path, and high level motion commands, the machine's internal numeric representation of the data required to interpolate the machine along the desired path to the end point of the current block. Normally, one high level motion command represents the motion associated with one block, however, this is not restrictive. Two or more blocks may be combined into one high level motion command if such a representation is possible and one motion block may be represented in multiple high level motion commands. The logical concatenation of high level motion commands describes the programmed path. The data streams represented by the term "high level motion commands" may also contain information that is not a high level motion command. Such information could be feedrate settings, miscellaneous codes, offset selections etc. or other internal data for maintaining system integrity.

The trajectory interpolator splits a high level motion command into a stream of interpolated position commands, based on the interpolation mode.

The interpolation mode comprises a specification of the geometric path to be traversed by the cutting tool from the programmed start point to the programmed end point. The interpolation mode also includes indications on how the feedrate specification is to be interpreted by the trajectory interpolator. Some typical examples of interpolation modes are:

linear interpolation in which the cutting tool is traversed in a straight line at a predetermined feedrate;

circular interpolation in which the cutting tool is traversed in a circular arc at a predetermined feedrate;

spline interpolation in which the cutting tool is traversed in a smooth geometric curve at a predetermined feedrate: and rapid interpolation in which the cutting tool is traversed in a straight line as quickly as possible.

An interpolated position command is a "snap-shot" of the desired machine position at some position on the programmed path. One interpolated position command is generated by the trajectory interpolator once every machine update period (on average).

The next interpolated position command is generated by interpolating from the current interpolated position command along a path described by the interpolation mode by a distance equal to the magnitude of a position displacement determined from the feedrate specification.

The position controller of the CNC machine conventionally receives the interpolated position commands, at an average operating frequency of one interpolated position command every machine update period and performs a control algorithm that causes the cutting tool to attempt to attain the position determined from the interpolated position command. The position controller module may be implemented with any combination of software, firmware and hardware.

CNC machines may also include a manually responsive means, usually a manual pulse generator (MPG) and/or a handwheel, which is used in manual mode operation of the CNC machine to enable the operator to position the machine manually in a selected direction. A manual pulse generator (MPG) generally comprises an electro-mechanical device which generates electrical signals (usually pulses) dependent upon its position which may be adjusted manually by means of a handwheel, joystick or similar device.

Conventionally, the MPG generates pulses proportional to its angular position, and a handwheel is mechanically attached to the MPG allowing the operator to adjust the angular position of the MPG.

Traditionally, the handwheel and/or MPG on a CNC machine is used solely in manual mode operation. In this mode, the trajectory interpolator is usually dormant and a typical functional layout of such a system is illustrated in FIG. 1 of the drawings.

More recently, however, the use of the MPG on a CNC machine has been extended to include MPG live offset mode during automatic mode operation. In this mode of operation, the trajectory interpolator is not dormant but is instead operating normally. In live offset mode, operation of the MPG or handwheel causes the CNC machine to superimpose a position displacement of the MPG onto the normal motion of the machine thereby offsetting the machine position in a selected direction from the programmed path. This direction is usually selected by pressing a button or switch corresponding to an axis of movement. A functional layout of such a system is shown in the diagram of FIG. 2 of the drawings.

It is desirable in a computer numerically controlled machine tool to test a part program prior to using the program. This has previously been achieved by one or more different part program tryout techniques which suffer from various disadvantages as follows.

The part program may be executed at a dry run feedrate in which a feedrate setting, group of settings or algorithm is designed to determine or calculate a feedrate suitable for executing the part program at high speed when the cutting tool is not in contact with the workpiece. Dry run feedrate usually overrides the programmed feedrate.

There is, however, significant danger in operating machines at high speed, even if the cutting tool is moved away from the workpiece. The forces that modern machine tools can exert in a crash situation are large enough to cause considerable damage to the machine tool itself and to its surrounding environment. Any part program errors can result in disastrous and costly machine crashes before the tester has time to react to the machine leaving the part programmer's desired path and take evasive action.

Alternatively, the part program may be executed with a scaled feedrate by using a feedrate override selector to scale down the feedrate to a fraction of the programmed feedrate. The programmed feedrate may be overridden by various means. One common method is to use the feedrate override selector to scale the feedrate to a percentage (e.g.: 10%) of its programmed value and execute the part program. One example of such a previously proposed machine tool which provides for scaled feedrate override in automatic mode is disclosed in U.S. Pat. No. 4,510,427.

U.S. Pat. No. 4,510,427 discloses a numerically controlled machine which may be operated in different modes and which includes jog feed buttons and a manual pulse generator or MPG. The machine tool described in this patent may be operated in any one of the following modes:

jog feed mode (JOG) which is a form of manual mode operation using a jog feed button but which allows for scaled override of the jog feedrate by means of the MPG;

normal manual mode (HDL) in which movement of the tool of the machine is controlled purely manually by the MPG; and automatic run mode which also allows the MPG to scale the feedrate up or down to a scaled percentage (%) of the automatic commanded feed speed depending upon the position to which the handwheel of the MPG is turned.

When the MPG of the machine of U.S. Pat. No. 4,510,427 is used in automatic run mode, it functions as a sensitive, multi-turn feedrate override selector and eliminates the need for a separate feedrate override selector unit. However, whilst a machine tool with feedrate override increases the response time that the tester is given to respond to a potential crash situation, it still suffers from several disadvantages.

One disadvantage is that program tryout time is often increased, due to the slow feedrates.

Also, when the program is designed to take the machine very close to dangerous positions, the response time (to part program errors) available to the tester to take evasive action is reduced.

Further, many part programs contain motion blocks with a very low programmed feedrate, immediately followed by motion blocks with a very high programmed feedrate. A good example of this is seen in creep feed grinding applications where motion blocks with a programmed feedrate in the order of 0.05 mm/min are followed by rapid mode motion blocks that retract the cutting tool away from the workpiece and position the cutting tool ready for the next cutting or grinding operation. In this case, 10% of the rapid mode feedrate specification (typically about 5000 mm/min) is far too high. When the machine reaches the end of the 0.05 mm/min move, it will appear to move suddenly very quickly in comparison, when it reaches the rapid mode motion block. Another danger exists in this type of application. During the execution of the 0.05 mm/min motion block, the tester may set the feedrate override selector back to 100% (or even higher) since the machine will still be moving very slowly. When the machine reaches the rapid mode motion block, it will suddenly move off at full speed, greatly increasing the risk of a machine crash.

More recently, a further part program tryout technique has been developed in which a graphical representation of the programmed path is displayed without actually moving the machine.

The use of graphical simulation for program tryout is very effective for two-dimensional machines and can be reasonably effective for three-dimensional machines. However, when the machine includes contoured workpiece or cutting tool orientation as well as two- or three-dimensional positioning, display of a programmed path on a two-dimensional VDU becomes very difficult for the tester to interpret.

Furthermore, graphical simulation can hide too much detail. The tester is often not able to focus on the detail of one small section of the programmed path due to the resolution and perspective limitations of the VDU. Very small errors in the programmed path (e.g.: less than 1 mm) may go unnoticed during graphical simulation yet may cause a machine crash when the part program is executed.

It is therefore desirable to provide a CNC machine which can test a part program and which does not suffer from the disadvantages of the previously proposed part program tryout techniques described above.

It is desirable to provide the tester of a CNC machine with more precise control over the speed at which the machine travels during program Tryout, thereby reducing the risk of the machine crashing because of part program errors.

It is also desirable to allow the tester to view the machine tool actually executing the part program with the machine being able to slow down at regions where examination of fine detail is required.

It is further desirable to provide the operator of a CNC machine with an improved means of controlling the movement of the cutting tool without the cutting tool departing from its programmed path. Hitherto, during execution of a part program which automatically moves a cutting tool along the programmed path, an operator has only been able to control the movement of the cutting tool by use of a feedrate override selector to scale the feedrate up or down and/or by use of an MPG in live offset mode to offset the cutting tool from its programmed path in a selected direction.

According to a broad aspect of the present invention there is provided a computer numerically controlled (CNC) machine having a movable operative part movable along a programmed path determined by a part program wherein the machine includes manually operable control means operable to control movement of the movable operative part of the machine incrementally along the programmed path.

Preferably, movement of the operative part of the CNC machine, which in many applications will comprise a machine tool having a cutting tool as the movable operative part, is controllable by the manually operable control means in both forward and reverse directions along the programmed path. This allows the operator to retrace along the programmed path and provides significant advantages over conventional CNC machines. For example, during part program tryout, the tester can retrace the cutting tool to reexamine suspect portions of the programmed path.

The ability to retrace along the programmed path also allows the operator to re-execute motion blocks that did not properly perform their desired tasks. For example, if a cutting tool failed to separate completely the two sections on each side of a cut, the operator may use the invention to retrace along the programmed path back past the problem portion and re-execute the cutting motion, repeating as required until the two cut portions separate.

Furthermore, sometimes when a cutting tool jams or breaks, the machine may be in a position such that the cutting tool may not be extracted from the workpiece in one of the allowable selected directions due to interference of the cutting tool with the workpiece, tooling or the machine members. This invention allows the operator to extract the cutting tool from the workplace by retracing along the programmed path leading into the jam position. This is likely to be the clearest path upon which to extract the cutting tool.

In a preferred form of the present invention, there is provided a CNC machine comprising a programmable control means programmed to generate high level motion command signals representing the programmed path of a movable machine part, typically a cutting tool, a trajectory interpolator which receives and processes said high level motion command signals to produce interpolated position command signals, and a position controller which controls movement of said movable machine part along said programmed path in accordance with said interpolated position command signals, wherein said CNC machine also includes manually operable incremental control means operable to generate manual control signals for controlling movement of said movable machine part incrementally along said programmed path. As used herein, the term "incremental control" refers to control of the position or displacement of said movable machine part along the programmed path, rather than control of the feedrate speed or speed of movement of the movable machine part.

Preferably, the CNC machine is also programmed to generate feedrate signals representing a feedrate specification of said movable machine part along said programmed path, the feedrate signals being fed into the trajectory interpolator for processing with the high level command signals.

The manually operable control means in a CNC machine in accordance with the invention preferably includes a manual pulse generator (MPG) which generates control signals or pulses to control movement of the operative part of the CNC machine along its predetermined path. Conveniently, a handwheel, joystick, jog buttons or other manually engageable means are connected to the MPG to allow the machine operator to adjust the position of the MPG. Thus, when a handwheel is provided, the MPG may be arranged to generate control signals or pulses proportional to changes in its angular position.

The control signals or pulses generated by the MPG are preferably superimposed onto signals representing the normal motion of the operative part along its programmed path in such a manner that the positional displacement of the MPG causes the machine tool to move along its programmed path in either the forward or reverse direction depending upon the direction in which the handwheel or other manually engageable means is moved by the operator. The control signals or pulses from the MPG thus represent the MPG feedrate and in the case of an MPG with a handwheel attachment, the amount of rotational displacement of the handwheel determines the amount by which the positional displacement of the operative part or cutting tool is controlled along its programmed path when the machine is in MPG feed mode. For instance, the feedrate specification may be turned to zero by means of a feedrate override selector, whereupon the distance the cutting tool moves along its programmed path in MPG feed mode is proportional to the amount the handwheel is moved. This is in contrast to a machine having MPG live offset facility and the machine of U.S. Pat. No. 4,510,427 which do not allow manual positional adjustment of a cutting tool along the programmed path in automatic mode.

It will be appreciated that a CNC machine in accordance with the invention may be operated in MPG feed mode during part program tryout to provide the advantages over conventional methods of part program tryout.

In the present invention, the risk of the machine crashing due to part program errors during program tryout is reduced because the tester has more precise control over the speed at which the machine travels. This control is independent of the interpolation mode and the feedrate specification. The invention thus allows the tester to view the machine actually executing the part program, slowing down at regions where fine detail must be examined.

Preferably, the MPG feedrate signals from the MPG are fed into the trajectory interpolator of the CNC machine where they are superimposed onto feedrate signals representing the normal feedrate specification of the machine tool. The feedrate specification is usually a combination of all the data required to determine the desired feedrate along the programmed path and can include: a programmed feedrate from the programmable feedrate generation means; rapid mode feedrate data, parameters or calculation algorithms; and feedrate overrides from a feedrate selector.

In a preferred embodiment, the trajectory interpolator comprises velocity interpolation means which receives and processes the feedrate specification signals and the MPG feedrate signals to produce feed magnitude and direction signals, and path interpolation means which receives and processes said high level motion command signals and said feed magnitude and direction signals to produce said interpolated position command signals. Conveniently, the trajectory interpolator also includes a motion command store to store said high level commands in a motion command queue before passing said high level motion commands sequentially to said path interpolator.

Examples of prior art operation of CNC machines, and a preferred embodiment of the present invention will now be described, by way of example only, with reference to the accompanying drawings in which:

FIG. 5 is a diagram of the MPG feed specification filter of the CNC machine of FIG. 3.

Figure 1:
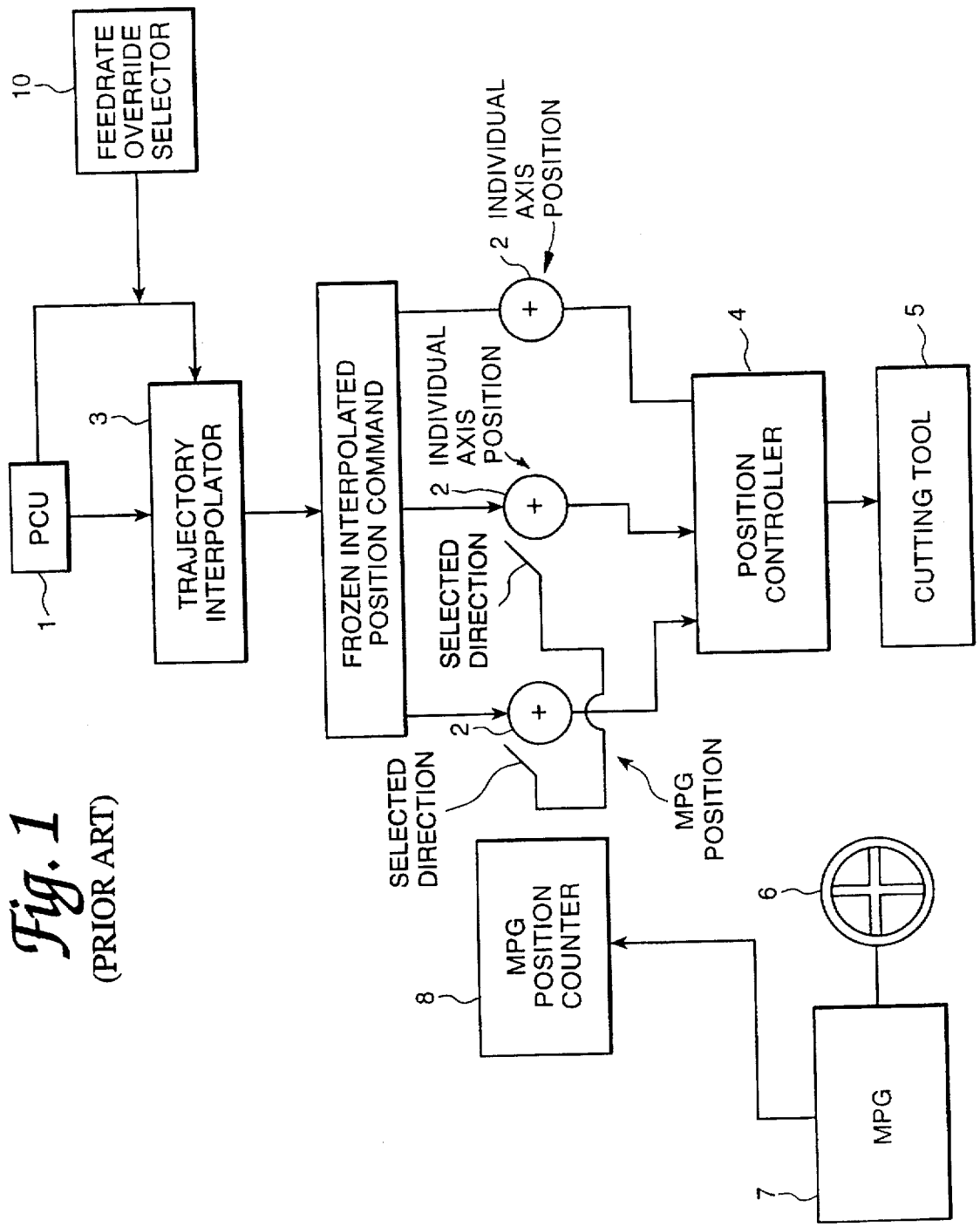
FIG. 1 is a diagram of a CNC machine in manual mode operation.
Figure 2:
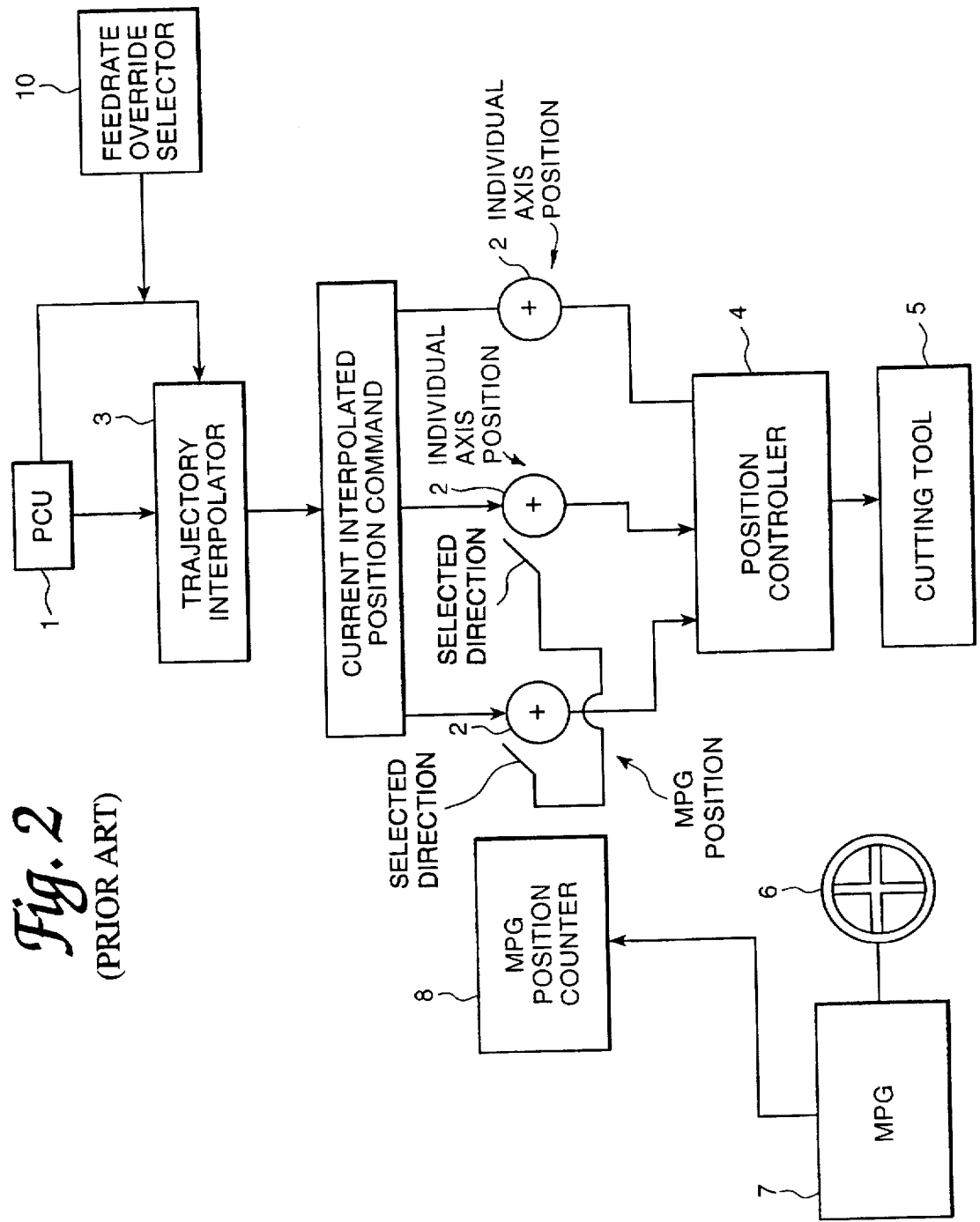
FIG. 2 is a diagram of a CNC machine in MPG live offset mode.

FIGS. 1 and 2 of the drawings show a conventional CNC machine tool comprising a main programmable control unit (PCU) 1, a trajectory interpolator 3, a position controller 4, a movable operative part or cutting tool 5, and, optionally, a feedrate override selector 10.

The CNC machine also includes manually operable control means in the form of a handwheel 6 and manual pulse generator MPG 7, an MPG position counter 8 and axis selection buttons or switches 2 which enable the CNC machine to be operated either in manual mode operation (FIG. 1) or in MPG live offset mode (FIG. 2) as will be described below.

During automatic mode operation of the CNC machine of FIGS. 1 and 2, the trajectory interpolator 3 receives high level motion command signals and feedrate specification signals from the PCU 1 and interpolates the signals received into a stream of interpolated position command signals, based on the programmed interpolation mode of the trajectory interpolator 3.

The feedrate specification is a combination of all the data required to determine the desired feedrate along the programmed path. This may include programmed feedrate; rapid mode feedrate data, parameters or calculation algorithms; and feedrate overrides from a feedrate override selector 10, feedrate override bits, limits and other overrides. The feedrate override selector 10 preferably comprises an electro-mechanical device used by the operator to adjust the scale of the programmed feedrate. The feedrate specification is sampled once every machine update period (on average) to allow for changes in the feedrate overrides.

The position controller 4 receives the interpolated position command signals from the trajectory interpolator 3 at an average operating frequency of one interpolated position command signal every machine update period and performs a control algorithm that controls movement of the operative part or cutting tool 5 causing the part or tool 5 to attempt to attain the position determined from the interpolated position command signal.

It will be appreciated that the position controller may control movement of the operative part in a well known manner by controlling the movement of a number of movable machine members (not shown) and joints forming linkages between adjacent machine members and between the last machine member and the cutting tool. A novel form of control of the movement of such machine members and joints is disclosed in our co-pending International Patent Application entitled "Improved Control of CNC Machine Tools" the contents of which shall be considered to form part of the disclosure of this patent as if they were incorporated herein.

With the provision of manually operable control means such as the handwheel 6 and MPG 7, the CNC machine can be operated in manual mode instead of in automatic mode. In manual mode, the trajectory interpolator is either switched off or dormant so that only a frozen interpolated position command signal is produced by the trajectory interpolator, as illustrated in FIG. 1. Manual operation of the handwheel 6 then causes the MPG 7 to send electrical pulses to the MPG position counter 8; the number of pulses being proportional to the amount of angular displacement of the handwheel 6. The MPG position counter 8 then sends control signals to the position controller 4 which moves the cutting tool 5 incrementally in a "selected direction" according to the control signals from the MPG position counter 8. The "selected direction" is usually selected by means of the axis selection buttons or switches 2 corresponding to the required axis or required direction of movement.

Alternatively, a CNC machine with a manual pulse generator 7 may be operated in a live offset mode (see FIG. 2) in which MPG control signals produced by the MPG position counter 8 in response to operation of the handwheel 6 are sent to the position controller 4 which offsets the position of the cutting tool 5 in a selected direction by moving the cutting tool 5 incrementally in the selected direction. Once again, the selected direction is usually selected by means of the axis selection buttons or switches 2 corresponding to the required axis or direction of movement.

Figure 3:
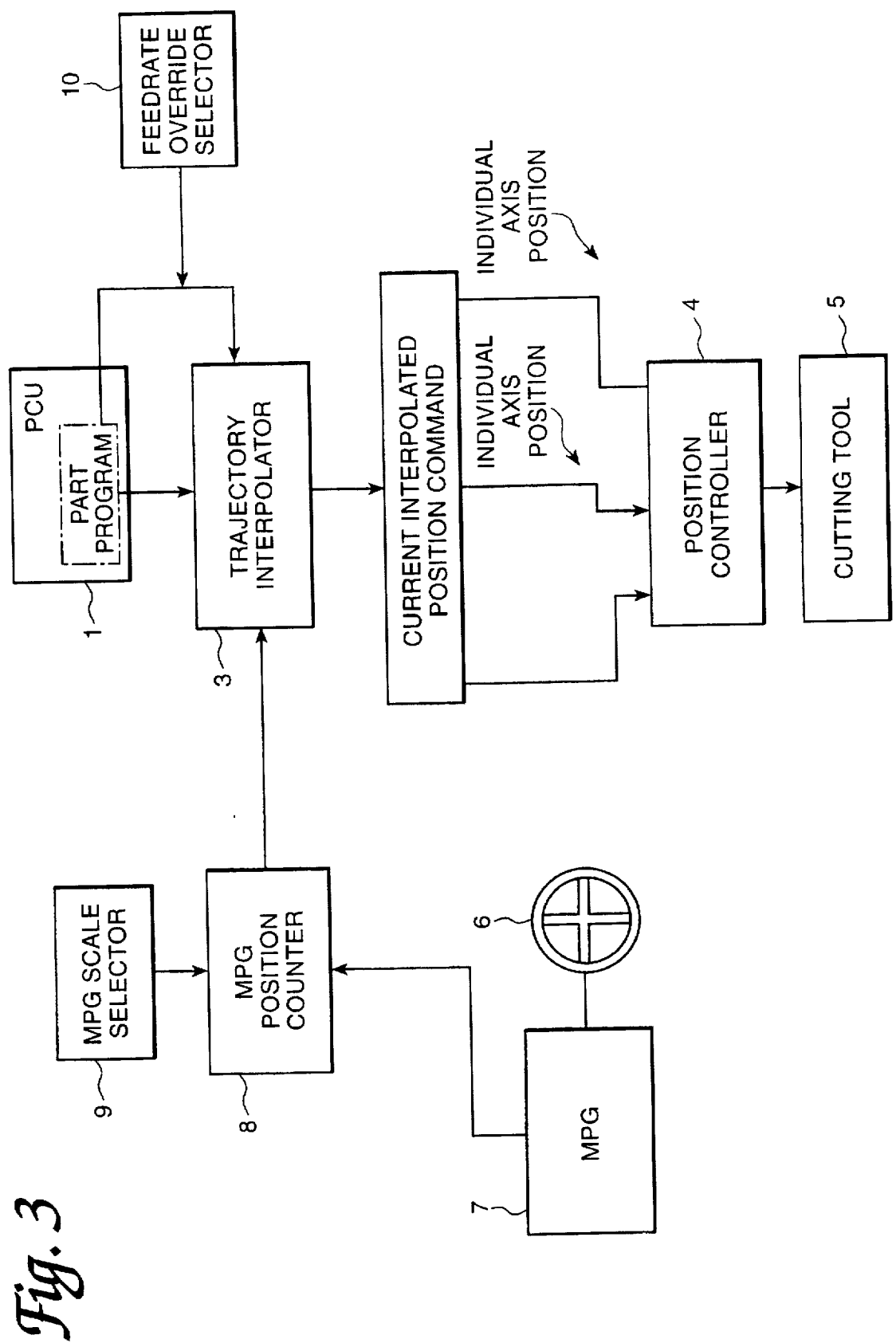
FIG. 3 is a diagram of a CNC machine in accordance with the invention in MPG feed mode.
Figure 4:
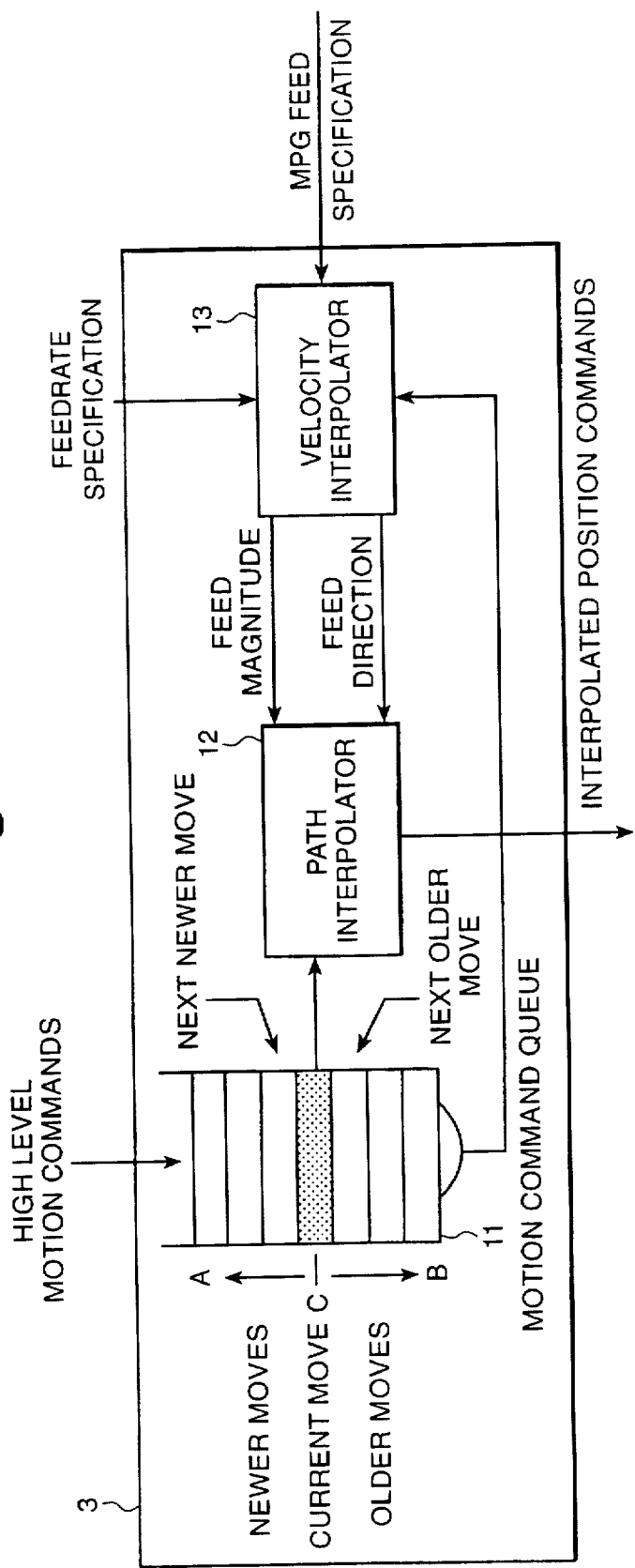
FIG. 4 is a diagram of the trajectory interpolator of the CNC machine of FIG. 3.

A preferred embodiment of a CNC machine in accordance with the invention is illustrated diagrammatically in FIGS. 3 to 5. Referring to FIG. 3, the CNC machine is essentially similar to the CNC machine illustrated in FIGS. 1 and 2, and corresponding reference numerals have been applied to corresponding parts.

The machine of FIGS. 3 to 5 differs from that of FIGS. 1 and 2 in that it has a manual control facility which allows manual adjustment of the position of the cutting tool 5 incrementally along the programmed path. This is achieved in the embodiment of FIGS. 3 to 5 by the input of an MPG feed specification into the trajectory interpolator 3.

The CNC machine of FIGS. 3 to 5 may be operated in automatic mode in the same manner as the machine of FIGS. 1 and 2. In purely automatic mode operation, no signals are passed from the MPG position counter to the trajectory interpolator. In contrast to conventional CNC machines the CNC machine of FIG. 3 may be operated in MPG feed mode, wherein the operator of the machine is able to control manually the movement of the cutting tool in either the forward or reverse direction incrementally along the programmed path by moving the handwheel 6 (or other manually operable means such as a joystick or the like) by the required degree in the required direction.

During MPG feed mode, the MPG position counter 8 operates at an appropriate frequency that is similar to or greater than the machine update frequency. MPG pulses from the MPG 7 are detected by the MPG position counter 8 which encodes the pulses into a register which represents the angular position of the MPG 7. The difference between this position register and the value of the position register prior to this iteration is multiplied by the MPG scale which may be selected by MPG scale selector 9. The MPG scale is a scaling factor that determines the meaning of one MPG pulse. Often this selection is performed by pressing an MPG scale factor button (e.g.: X1, X10, X100 etc.) or by selecting a setting from a discrete or continuous rotary switch of the MPG scale selector 9. The result is a position representing the scaled displacement between the current angular position of the MPG and the angular position of the MPG at the previous iteration. The sign (positive or negative) of this result indicates the direction of rotation of the MPG. This value is then passed to the trajectory interpolator as the MPG feed specification.

The trajectory interpolator combines the MPG feed specification with the programmed feedrate specification and other internal parameters for acceleration, deceleration etc whilst interpreting the high level motion commands from the PCU 1 to produce one interpolated position command every machine update period (on average). This output is called the current interpolated position command.

A current interpolated position command is passed from the trajectory interpolator 3 to the position controller 4 once every machine update period (on average). The position controller 4 attempts to cause the cutting tool 5 to follow the path described by the time ordered list of interpolated position commands passed from the trajectory interpolator 3.

The trajectory interpolator 3 of the CNC machine and its manner of operation will now be described in greater detail with reference to FIGS. 4 and 5 of the drawings. Referring to FIG. 4, the trajectory interpolator 3 includes a motion command store 11, a path interpolator 12 and a velocity interpolator 13. The motion command store 11 receives the high level motion command signals from the PCU 1 and stores them in a time ordered motion command queue for sequential interpolation by the path interpolator. High level motion commands entering the motion command store 11 of the trajectory interpolator 3 are placed on the motion command queue at the top of the queue in the direction given by the arrow A representing newer moves with older moves being represented by arrow B below the current move C. If the motion command queue is full, block processing in the PCU 1 will be suspended until such time as space becomes available in the motion command queue for further high level motion commands.

The path interpolator 12 of the trajectory interpolator 3 is responsible for producing a new interpolated position command based on feed magnitude and feed direction signals from the velocity interpolator 13 and a signal representing the current move from the motion command store. The feed magnitude is the magnitude of the distance by which the path interpolator 12 must modify the path parameter in order to produce the next interpolated position command. The feed direction is the direction forward or reverse, in which the path interpolator must modify the path parameter in order to produce the next interpolated position command.

The path parameter is a scalar mathematical entity(s) used as the independent variable in path interpolation such that the equation of motion for the current move is expressed as:

$$P' = P^o + D \cdot s$$

where:

P' is a vector representing a position on the programmed path (within the current move).

$P^o$ is a vector representing the programmed start position of the current move.

D is a vector representing the rate of change of P with respect to the path parameter(s).

The path parameter(s) is usually designed to be an entity that has a close to linear relationship with arc length. Arc length itself is often used directly as the path parameter (e.g. in linear interpolation mode). Sometimes chord length is used.

In this definition, the path parameter will be equal to 0 when $P = P^o$ and will increase as P moves from $P^o$ to the programmed end position. It is also possible to define $P^o$ to be the programmed end position so that s is equal to 0 when P=programmed end position and s increases as P moves from the programmed end position to the programmed start position. The choice of definition of $P^o$ is arbitrary and usually dictated by the internal workings of the trajectory interpolator 3. For the purposes of this description, $P^o$ has been arbitrarily chosen to be the programmed start position. However, it should be appreciated that the scope of this invention covers implementations where $P^o$ is chosen as the programmed end position. In this case The equation of motion for the current move may be expressed as:

$$P' = P^o - D \cdot s$$

The path interpolator processes the current move by performing path interpolation based on the current move's equation of motion, the current path parameter, the feed magnitude and the feed direction. The feed magnitude and feed direction are input once every machine update period (on average). Every machine update period (on average), The path parameter is recalculated as:

$$s = s^o + K \cdot f \qquad \text{Eqn 1}$$

where:

s is the new path parameter;

$s^o$ is the path parameter from the previous iteration;

K is 1 if feed direction is forward, −1 if feed direction is reverse (retrace); and f is a distance value representing The feed magnitude determined by the velocity interpolator.

If s (as calculated from Eqn 1) is less than 0, Then the path interpolator has retrace interpolated back to the programmed start position of the current move and thus, must make the next older move, the current move. It does this by adjusting the motion command queue such that the current move becomes the next newer move and the next older move becomes the current move. It then sets the path parameter:

$$s = s^e + r$$

where:

$s^e$ is the path parameter end constant; and r is the overrun;

which sets the path parameter to the path parameter end constant less the magnitude of the overrun on what was the current move (at the previous iteration).

The path parameter end constant is a scalar mathematical constant ($s^e$) that represents the path parameter at the programmed end position of the current move. With reference to the definition of path parameter, $s^e$ can be represented by the following equation:

$$P^e = P^o + D \cdot s^e$$

where:

$P^o$ is defined in the definition of path parameter;

D is defined in the definition of path parameter; and $P^e$ is a vector representing the programmed end position of the current move.

In implementations where $P^o$ is defined as the programmed end position, $s^e$ is defined by the equation:

$$P^s = P^o - D \cdot s^e$$

where:

$P^s$ is a vector representing the programmed start position of the current move.

The overrun (r) is a scalar mathematical entity that represents the distance that the calculated path parameter(s) has overrun the programmed start position of the current move in retrace mode (r is negative) or the programmed end position of the current move in forward mode (r is positive).

Negative overrun is defined by the equation:

$$r = s \text{ when } s < 0$$

Positive overrun is defined by the equation:

$$r = s - s^e \text{ when } s > s^e$$

where:

$s^e$ is the path parameter end constant of the current move as defined above.

If, however, s (as calculated from Eqn 1) is greater than $s^e$ then The path interpolator has forward interpolated past the programmed end position of the current move and thus, must make the next newer move, the current move. It does this by adjusting the motion command queue such that the current move becomes the next older move and the next newer move becomes the current move. It then checks to see if the number of older moves in the motion command queue is greater than a parameter. If so, the oldest high level motion command in the motion command queue is flushed from the queue which makes room for one more queue item at the top of the queue (i.e. the motion command queue becomes not full). If block processing has been suspended due to a full motion command queue, the trajectory interpolator causes block processing to resume. It then sets the path parameter:

$$s=r$$

where:

r is the overrun:

which sets the path parameter to the magnitude of the overrun on what was the current move (at the previous iteration).

If s (as calculated from Eqn 1) is greater than or equal to zero and less than or equal to $s^e$ then the path interpolator 12 continues with processing the current move.

The equation of motion is then used to calculate the new position P' based on the calculated value of s. P' is then packaged as an interpolated position command and passed out of the trajectory interpolator for further processing.

The velocity interpolator 13 of the trajectory interpolator 3 is responsible for producing a new value for feed magnitude and feed direction, once every machine update period (on average), based on the feedrate specification, MPG feed specification and the contents of the motion command queue.

The velocity interpolator is invoked once every machine update period (on average). Each iteration, the velocity interpolator performs the following processing:

From the feedrate specification, the desired velocity ($V^d$) is determined. This is the velocity that the operator expects the machine to attempt to reach at this iteration disregarding MPG feed specification. $V^d$ may be less than zero if the operator has access to a retrace selector. $V^d$ is then passed through various filters that produce an output ($V^f$) which is the filtered velocity. The filters applied to $V^d$ account for acceleration and deceleration limits, jerk (derivative of acceleration) limits, radial acceleration limits, provision for continuity of velocity and acceleration over block boundaries. Often, high level motion commands in the motion command queue (as well as the current move) are used in these algorithms.

Once $V^f$ has been determined, it is multiplied by the machine update period, to produce a distance value (d) which represents the required change in path parameter(s) from the previous iteration to the current iteration. If d is positive, this represents $V^f$ in the forward direction. If d is negative, this represents $V^f$ in the retrace direction, i.e.:

$$d=V^f.t^u$$

where:

$V^f$ is the filtered feedrate specification; and $t^u$ is the machine update period.

The MPG feed specification which is sent from the MPG position counter 8 to the trajectory interpolator 3 is a scalar mathematical entity (m) which represents the scaled difference (via MPG scale) between the current MPG position and the MPG position at the previous iteration. A positive value of m indicates that the MPG is being rotated in the forward MPG direction. A negative value of m indicates that the MPG is being rotated in the reverse MPG direction, also referred to herein as the retrace MPG direction.

The MPG feed specification signals (m) are filtered using a single stage digital filter 14, which conveniently may be included in the velocity interpolator 14, and which is shown in FIG. 5 of the drawings. The MPG feed specification filter 14 includes addition means 15, a gain block 16, subtraction means 17 and an accumulator 18.

The MPG feed specification signal (m) is input into the filter algorithm once every iteration. The addition means 15 of the filter adds m to the value of the accumulator 18 which has been saved from the previous iteration. The result ($m'$) is fed into the gain block 16 which scales by a value less than 1 to produce an output ($m^f$). The output of the gain block ($m^f$) is the output of the MPG feed specification filter for the iteration. $m^f$ is then subtracted from $m'$ in the subtraction means 17 of the filter and the result is stored in the accumulator 18.

The velocity interpolator then calculates the feed magnitude and the feed direction outputs via the equation:

$$K.f=d+m^f$$

where:

f is the feed magnitude; and

K is the feed direction.

K=+1 (forward)—if $d+m^f$ is greater than or equal to 0.

K=−1 (retrace)—if $d+m^f$ is less than 0.

Thus, it will be appreciated from the above that the filtered MPG feed specification $m^f$ is superimposed onto the distance value d calculated by the velocity interpolator 13 from the feedrate specification signals to produce the distance value f representing the required change in path parameter s. In other words, the position displacement of the MPG is superimposed onto the normal motion of the cutting tool in the programmed direction; the programmed direction being the direction the cutting tool will move as it executes a part program in a normal way from the first motion block to the last motion block in the program. The present invention thus provides the operator of a CNC machine with manual control of movement of the cutting tool or other operative part incrementally along the programmed path in either the forward or reverse (retrace) direction.

We claim:

1. A CNC machine comprising:

a tool;

a programmable control unit programmed to generate motion command signals which determine a programmed path for the tool;

said programmable control unit also being programmed to generate programmed feedrate signals which, in an automatic mode of operation, determine a magnitude of a vectorial velocity for the tool in an instantaneous direction of said programmed path at each position on said programmed path as the tool moves automatically along said programmed path;

a trajectory interpolator for processing said motion command signals and said programmed feedrate signals to produce interpolated position command signals;

a position controller for moving said tool along said programmed path in accordance with said interpolated position command signals; and a manual pulse generator for manually generating a train of pulse signals of a variable frequency which is input to the trajectory interpolator;

wherein said manual pulse generator includes a manually movable part movable in a forward direction and in a reverse direction and the frequency of the manually generated train of pulse signals is variable in proportion to the speed of movement of the manually movable part;

wherein the trajectory interpolator processes said programmed feedrate signals and said train of manually generated pulse signals;

wherein movement of the manually movable part in the forward direction causes the tool to move in a forward direction along the programmed path, the magnitude of the instantaneous vectorial velocity of the tool in the forward direction of the programmed path being controlled in proportion to the frequency of the train of manually generated pulse signals;

wherein the manually movable part of the manual pulse generator comprises a handwheel which is rotatable in a forward direction and in a reverse direction, and the frequency of the manually generated train of pulse signals is variable in proportion to a speed of rotation of the handwheel; and wherein, in the automatic mode of operation, rotation of the handwheel in the forward direction increases the magnitude of the instantaneous vectorial velocity of the tool in the forward direction of the programmed path.

2. A CNC machine according to claim 1 wherein the trajectory interpolator includes a velocity interpolator and the manually generated pulse signals represent a manual pulse generator feedrate specification which is superimposed on a programmed feedrate specification represented by said programmed feedrate signals during processing by said velocity interpolator in the automatic mode of operation.

3. A CNC machine according to claim 1 wherein the manually generated train of pulse signals represents a manual pulse generator feedrate specification which is superimposed on said programmed feedrate specification represented by said programmed feedrate signals during processing by said trajectory interpolator.

4. A CNC machine according to claim 1, wherein the tool comprises a cutting tool.

5. A CNC machine according to claim 1 wherein the machine is also operable in a manual mode of operation when no programmed feedrate signals are received by said trajectory interpolator, movement of the tool in said manual mode being manually controllable along said programmed path by movement of the manually movable part of said manual pulse generator.

6. A CNC machine according to claim 5 wherein, in said manual mode of operation, movement of the manually movable part in the forward direction moves the tool in a forward direction of the programmed path, the magnitude of the vectorial velocity of the tool in the instantaneous direction of the programmed path being proportional to the speed of movement of the manually movable part.

7. A CNC machine according to claim 5 wherein, in said manual mode of operation, movement of the manually movable part in the reverse direction moves the tool in a reverse direction of the programmed path, the magnitude of the vectorial velocity of the tool in the instantaneous direction of the programmed path being proportional to the speed of movement of the manually movable part.

8. A CNC machine according to claim 5 wherein the manually movable part of the manual pulse generator comprises a handwheel which is rotatable in a forward direction and in a reverse direction.

9. A CNC machine comprising:

a tool;

a programmable control unit programmed to generate motion command signals which determine a programmed path for the tool;

said programmable control unit also being programmed to generate programmed feedrate signals which, in an automatic mode of operation, determine a magnitude of a vectorial velocity for the tool in an instantaneous direction of said programmed path at each position on said programmed path as the tool moves automatically along said programmed path;

a trajectory interpolator for processing said motion command signals and said programmed feedrate signals to produce interpolated position command signals;

a position controller for moving said tool along said programmed path in accordance with said interpolated position command signals; and a manual pulse generator for manually generating a train of pulse signals of a variable frequency which is input to the trajectory interpolator;

wherein said manual pulse generator includes a manually movable part movable in a forward direction and in a reverse direction and the frequency of the manually generated train of pulse signals is variable in proportion to the speed of movement of the manually movable part;

wherein the trajectory interpolator processes said programmed feedrate signals and said train of manually generated pulse signals;

wherein movement of the manually movable part in the forward direction causes the tool to move in a forward direction along the programmed path, the magnitude of the instantaneous vectorial velocity of the tool in the forward direction of the programmed path being controlled in proportion to the frequency of the train of manually generated pulse signals;

wherein the manually movable part of the manual pulse generator comprises a handwheel which is rotatable in a forward direction and in a reverse direction, and the frequency of the manually generated train of pulse signals is variable in proportion to a speed of rotation of the handwheel; and wherein, in the automatic mode of operation, rotation of the handwheel in the reverse direction decreases the magnitude of the instantaneous vectorial velocity of the tool in the forward direction of the programmed path.

10. A CNC machine comprising:

a tool;

a programmable control unit programmed to generate motion command signals which determine a programmed path for the tool;

said programmable control unit also being programmed to generate programmed feedrate signals which, in an automatic mode of operation, determine a magnitude of a vectorial velocity for the tool in an instantaneous direction of said programmed path at each position on said programmed path as the tool moves automatically along said programmed path;

a trajectory interpolator for processing said motion command signals and said programmed feedrate signals to produce interpolated position command signals;

a position controller for moving said tool along said programmed path in accordance with said interpolated position command signals; and a manual pulse generator for manually generating a train of pulse signals of a variable frequency which is input to the trajectory interpolator;

wherein said manual pulse generator includes a manually movable part movable in a forward direction and in a reverse direction and the frequency of the manually generated train of pulse signals is variable in proportion to the speed of movement of the manually movable part;

wherein the trajectory interpolator processes said programmed feedrate signals and said train of manually generated pulse signals;

wherein movement of the manually movable part in the forward direction causes the tool to move in a forward direction along the programmed path, the magnitude of the instantaneous vectorial velocity of the tool in the forward direction of the programmed path being controlled in proportion to the frequency of the train of manually generated pulse signals;

wherein the manually movable part of the manual pulse generator comprises a handwheel which is rotatable in a forward direction and in a reverse direction, and the frequency of the manually generated train of pulse signals is variable in proportion to a speed of rotation of the handwheel; and wherein, in the automatic mode of operation, rotation of the handwheel above a certain speed in the reverse direction causes the tool to move in a reverse direction of the programmed path.

11. A CNC machine comprising:

a tool;

a programmable control unit programmed to generate motion command signals which determine a programmed path for the tool;

said programmable control unit also being programmed to generate programmed feedrate signals which, in an automatic mode of operation, determine a magnitude of a vectorial velocity for the tool in an instantaneous direction of said programmed path at each position on said programmed path as the tool moves automatically along said programmed path;

a trajectory interpolator for processing said motion command signals and said programmed feedrate signals to produce interpolated position command signals;

a position controller for moving said tool along said programmed path in accordance with said interpolated position command signals; and a manual pulse generator for manually generating a train of pulse signals of a variable frequency which is input to the trajectory interpolator;

wherein the trajectory interpolator includes a velocity interpolator for processing said programmed feedrate signals and said train of manually generated pulse signals in such a manner that the magnitude of the vectorial velocity of the tool in the instantaneous direction of the programmed path is controllable proportionally in response to the frequency of the train of the manually generated pulse signals; and wherein said velocity interpolator is arranged to receive and process said programmed feedrate signals and the manually generated train of pulse signals to produce velocity magnitude and velocity direction signals, and said trajectory interpolator includes path interpolation means for receiving and processing said motion command signals and said velocity magnitude and velocity direction signals to produce said interpolated position command signals.

12. A CNC machine according to claim 11, wherein said trajectory interpolator includes a motion command store to store said motion command signals in a motion command queue before passing said motion command signals sequentially to said path interpolation means.

13. A CNC machine according to claim 12, wherein each motion command signal passed to the path interpolation means from the motion command store represents a current move for the tool, each current move having a programmed start position and a programmed end position on the programmed path, movement of the tool along the programmed path being determined by a path parameter which is recalculated every machine update period from said velocity magnitude and velocity direction signals.

14. A CNC machine according to claim 13 wherein when the feed direction signal is negative, the path interpolation means produces an interpolated position command signal which causes the position controller to move the tool in a reverse direction and retrace said programmed path.

15. A CNC machine according to claim 14, wherein when the magnitude of the path parameter is such that it will cause the tool to overrun back past the programmed start position of a current move, the trajectory interpolator adjusts the motion command queue as the tool passes the programmed start position in such a manner that the current move becomes the next newer move and the next older move becomes the current move for a subsequent machine update period.

16. A CNC machine according to claim 15, wherein the magnitude of the path parameter for the subsequent machine update period is reset to the magnitude of an overrun as the tool passes the programmed start position.

17. A CNC machine according to claim 13, wherein when the velocity direction signal is positive, the path interpolation means produces an interpolated position command signal which causes the position controller to move the tool in a forward direction along the programmed path.

18. A CNC machine according to claim 17, wherein when the magnitude of the path parameter is such that it will cause the tool to overrun past the programmed end position of a current move, the trajectory interpolator adjusts the motion command queue as the tool moves past the programmed end position of the current move in such a manner that the current move becomes the next older move and the next newer move becomes the current move for a subsequent machine update period.

19. A CNC machine according to claim 18, wherein the path parameter for the subsequent machine update period is reset to the magnitude of overrun as the tool passes the programmed end position.

* * * * *